US012810889B2

(12) United States Patent
Song et al.

(10) Patent No.: US 12,810,889 B2
(45) Date of Patent: Nov. 24, 2026

(54) ELECTRONIC APPARATUS AND CONTROLLING METHOD THEREOF

(71) Applicant: SAMSUNG ELECTRONICS CO., LTD., Suwon-si (KR)

(72) Inventors: Jeongook Song, Suwon-si (KR); Jiwon Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 194 days.

(21) Appl. No.: 18/742,495

(22) Filed: Jun. 13, 2024

(65) Prior Publication Data

US 2024/0371396 A1 Nov. 7, 2024

Related U.S. Application Data

(63) Continuation of application No. PCT/KR2024/006013, filed on May 3, 2024.

(30) Foreign Application Priority Data

May 4, 2023 (KR) ........................ 10-2023-0058481
Mar. 14, 2024 (KR) ........................ 10-2024-0036014

(51) Int. Cl.
*G10L 25/51* (2013.01)
*G10L 25/03* (2013.01)

(52) U.S. Cl.
CPC .............. *G10L 25/51* (2013.01); *G10L 25/03* (2013.01)

(58) Field of Classification Search
CPC ..... G10L 25/51; G10L 25/03; G10L 21/0272; G10L 25/18; G10L 25/30
See application file for complete search history.

(56) References Cited

U.S. PATENT DOCUMENTS 5,687,285 A 11/1997 Katayanagi et al.
7,624,022 B2 11/2009 Son et al.
(Continued)

FOREIGN PATENT DOCUMENTS

CN 113345465 A 9/2021
JP 2021-76762 A 5/2021
(Continued)

OTHER PUBLICATIONS

International Search Report (PCT/ISA/210) issued by the International Searching Authority on Jul. 31, 2024 in corresponding International Application No. PCT/KR2024/006013.
(Continued)

*Primary Examiner* — Abul K Azad
(74) *Attorney, Agent, or Firm* — Sughrue Mion, PLLC

(57) ABSTRACT

A method of controlling an electronic apparatus may include: acquiring a first audio signal may include an audio signal corresponding to a first audio source and an audio signal corresponding to a second audio source; acquiring a second audio signal by separating the audio signal corresponding to the first audio source from the first audio signal in a bandwidth below a preset frequency; acquiring a third audio signal by separating an audio signal in a bandwidth higher than or equal to the preset frequency from the first audio signal; acquiring a fourth audio signal by combining the second audio signal and the third audio signal; and for each of a plurality of frames constituting the fourth audio signal, acquiring a fifth audio signal by removing the component higher than or equal to the preset frequency.

20 Claims, 17 Drawing Sheets

(56) References Cited

U.S. PATENT DOCUMENTS

| | | | |
|---|---|---|---|
| 8,073,145 B2 | 12/2011 | Kondo et al. | |
| 8,582,785 B2 | 11/2013 | Moon | |
| 8,934,641 B2 | 1/2015 | Avendano et al. | |
| 9,472,204 B2 | 10/2016 | Lee et al. | |
| 9,666,200 B2 | 5/2017 | Thesing et al. | |
| 9,984,695 B2 | 5/2018 | Thesing et al. | |
| 11,170,785 B2 | 11/2021 | Yu | |
| 11,996,091 B2 | 5/2024 | Wang et al. | |
| 12,470,868 B2 * | 11/2025 | Gong | H04R 3/04 |
| 2007/0129036 A1 | 6/2007 | Arora | |
| 2008/0159563 A1 | 7/2008 | Moon | |
| 2010/0094643 A1 | 4/2010 | Avendano et al. | |
| 2015/0003632 A1 | 1/2015 | Thesing et al. | |
| 2017/0111737 A1 | 4/2017 | Painter et al. | |
| 2017/0186442 A1 * | 6/2017 | Cahill | G10L 21/0216 |
| 2017/0221491 A1 | 8/2017 | Thesing et al. | |
| 2023/0112265 A1 | 4/2023 | Zeghidour et al. | |

FOREIGN PATENT DOCUMENTS

| | | | |
|---|---|---|---|
| JP | 2021-516369 | A | 7/2021 |
| KR | 10-0513729 | B1 | 9/2005 |
| KR | 10-2008-0063647 | A | 7/2008 |
| KR | 10-2011-0111409 | A | 10/2011 |
| KR | 10-2014-0116520 | A | 10/2014 |
| KR | 10-2016-0030722 | A | 3/2016 |
| KR | 10-2016-0053582 | A | 5/2016 |
| KR | 10-2022-0169554 | A | 12/2022 |

OTHER PUBLICATIONS

Written Opinion (PCT/ISA/237) issued by the International Searching Authority on Jul. 31, 2024 in corresponding International Application No. PCT/KR2024/006013.

Communication dated Dec. 17, 2025 issued by the European Patent Office in European Patent Application No. 24800265.1.

* cited by examiner

ELECTRONIC APPARATUS AND CONTROLLING METHOD THEREOF

CROSS-REFERENCE TO RELATED APPLICATIONS

This application is a continuation application, claiming priority under § 365 (c), of an International application No. PCT/KR2024/006013, filed on May 3, 2024, which is based on and claims the benefit of a Korean patent application number 10-2023-0058481, filed on May 4, 2023, in the Korean Intellectual Property Office, and a Korean patent application number 10-2024-0036014, filed on Mar. 14, 2024, in the Korean Intellectual Property Office, the disclosure of which is incorporated by reference herein in its entirety.

BACKGROUND

1. Field

The present disclosure relates to an electronic apparatus and a controlling method thereof, and more particularly, to an electronic apparatus for separating audio signals, including audio signals corresponding to a plurality of audio sources, for each audio source, and a controlling method thereof.

2. Description of Related Art

An audio separation model may be a model that separates audio signals for each speaker from a single mixed audio signal. For example, it is assumed that there is a 10-second audio signal of a man and a woman talking simultaneously. The audio separation model may separate the 10-second audio signal into a 10-second audio signal uttered by a man and a 10-second audio signal uttered by a woman.

The existing audio separation models may separate audio signals in a specific frequency bandwidth in consideration of performance and speed.

SUMMARY

In this case, it is desirable to restore signals of a specific frequency bandwidth or more to improve the quality of the separated audio signal.

According to one or more example embodiments, a method of controlling an electronic apparatus may include: acquiring a first audio signal may include an audio signal corresponding to a first audio source and an audio signal corresponding to a second audio source; acquiring a second audio signal by separating the audio signal corresponding to the first audio source from the first audio signal in a bandwidth below a preset frequency; acquiring a third audio signal by separating an audio signal in a bandwidth higher than or equal to the preset frequency from the first audio signal; acquiring a fourth audio signal by combining the second audio signal and the third audio signal; and for each of a plurality of frames constituting the fourth audio signal, based on energy of a component below the preset frequency being below energy of a component higher than or equal to the preset frequency, acquiring a fifth audio signal by removing the component higher than or equal to the preset frequency.

The acquiring the fifth audio signal may include: based on the energy of the component below the preset frequency being greater than or equal to the energy of the component higher than or equal to the preset frequency, acquiring the fifth audio signal by maintaining the component higher than or equal to the preset frequency.

The acquiring the second audio signal may include: down sampling the first audio signal at a sampling rate corresponding to the preset frequency; and acquiring the second audio signal by separating the audio signal corresponding to the first audio source by inputting the down-sampled first audio signal to a neural network model.

The acquiring the third audio signal may include: acquiring a feature in the bandwidth higher than or equal to the preset frequency in the first audio signal based on the second audio signal; and acquiring the third audio signal using the feature.

The bandwidth below the preset frequency may be below the preset frequency and higher than or equal to a specific frequency.

The acquiring the fifth audio signal further may include: based on a preset pattern being identified for each of the plurality of frames constituting the fourth audio signal, acquiring the fifth audio signal by removing the component higher than or equal to the preset frequency.

The acquiring of the fifth audio signal may include: based on a value representing a similarity between a shape of the component below the preset frequency and a shape of a quadrant being greater than or equal to a preset value, removing the component higher than or equal to the preset frequency to acquire the fifth audio signal.

The acquiring the fifth audio signal may include: based on there being a component with a value of 0 among the component below the preset frequency, acquiring the fifth audio signal by removing the component higher than or equal to the preset frequency.

According to one or more example embodiments, an electronic apparatus may include: at least one memory storing instructions; and at least one processor operatively coupled to the at least one memory, the at least one processor being configured to execute the instructions to: acquire a first audio signal may include an audio signal corresponding to a first audio source and an audio signal corresponding to a second audio source; acquire a second audio signal by separating the audio signal corresponding to the first audio source from the first audio signal in a bandwidth less than a preset frequency; acquire a third audio signal by separating an audio signal in a bandwidth higher than or equal to the preset frequency from the first audio signal; acquire a fourth audio signal by combining the second audio signal and the third audio signal; and for each of a plurality of frames constituting the fourth audio signal, based on energy of a component below the preset frequency being below energy of a component higher than or equal to the preset frequency, acquire a fifth audio signal by removing the component higher than or equal to the preset frequency.

The at least one processor may be further configured to execute the instructions to: based on the energy of the component below the preset frequency being greater than or equal to the energy of the component higher than or equal to the preset frequency, acquire the fifth audio signal by maintaining the component higher than or equal to the preset frequency.

The at least one processor may be further configured to execute the instructions to: down-sample the first audio signal at a sampling rate corresponding to the preset frequency; and acquire the second audio signal by separating the audio signal corresponding to the first audio source by inputting the down-sampled first audio signal to a neural network model.

The at least one processor may be further configured to execute the instructions to: acquire a feature in the bandwidth higher than or equal to the preset frequency in the first audio signal based on the second audio signal; and acquire the third audio signal using the feature.

The bandwidth below the preset frequency may be below the preset frequency and higher than or equal to a specific frequency.

The at least one processor may be further configured to execute the instructions to: based on a preset pattern being identified for each of the plurality of frames constituting the fourth audio signal, acquire the fifth audio signal by removing the component higher than or equal to the preset frequency.

The at least one processor may be further configured to execute the instructions to: based on a value representing a similarity between a shape of the component below the preset frequency and a shape of a quadrant being greater than or equal to a preset value, acquire the fifth audio signal by removing the component higher than or equal to the preset frequency.

The at least one processor may be further configured to execute the instructions to: based on there being a component with a value of 0 among the component below the preset frequency, acquiring the fifth audio signal by removing the component higher than or equal to the preset frequency.

According to one or more example embodiments, a non-transitory computer readable medium storing instructions which are executable by at least one processor to perform a method for controlling an electronic apparatus, the method may include: acquiring a first audio signal comprising an audio signal corresponding to a first audio source and an audio signal corresponding to a second audio source; acquiring a second audio signal by separating the audio signal corresponding to the first audio source from the first audio signal in a bandwidth below a preset frequency; acquiring a third audio signal by separating an audio signal in a bandwidth higher than or equal to the preset frequency from the first audio signal; acquiring a fourth audio signal by combining the second audio signal and the third audio signal; and for each of a plurality of frames constituting the fourth audio signal, based on energy of a component below the preset frequency being below energy of a component higher than or equal to the preset frequency, acquiring a fifth audio signal by removing the component higher than or equal to the preset frequency.

The acquiring the fifth audio signal may include: based on the energy of the component below the preset frequency being greater than or equal to the energy of the component higher than or equal to the preset frequency, acquiring the fifth audio signal by maintaining the component higher than or equal to the preset frequency.

The acquiring the second audio signal may include: down sampling the first audio signal at a sampling rate corresponding to the preset frequency; and acquiring the second audio signal by separating the audio signal corresponding to the first audio source by inputting the down-sampled first audio signal to a neural network model.

The acquiring the third audio signal may include: acquiring a feature in the bandwidth higher than or equal to the preset frequency in the first audio signal based on the second audio signal; and acquiring the third audio signal using the feature.

BRIEF DESCRIPTION OF THE DRAWINGS

The above and other aspects, features, and advantages of the disclosure will be more clearly understood from the following detailed description, taken in conjunction with the accompanying drawings, in which.

DETAILED DESCRIPTION

Figure 1:
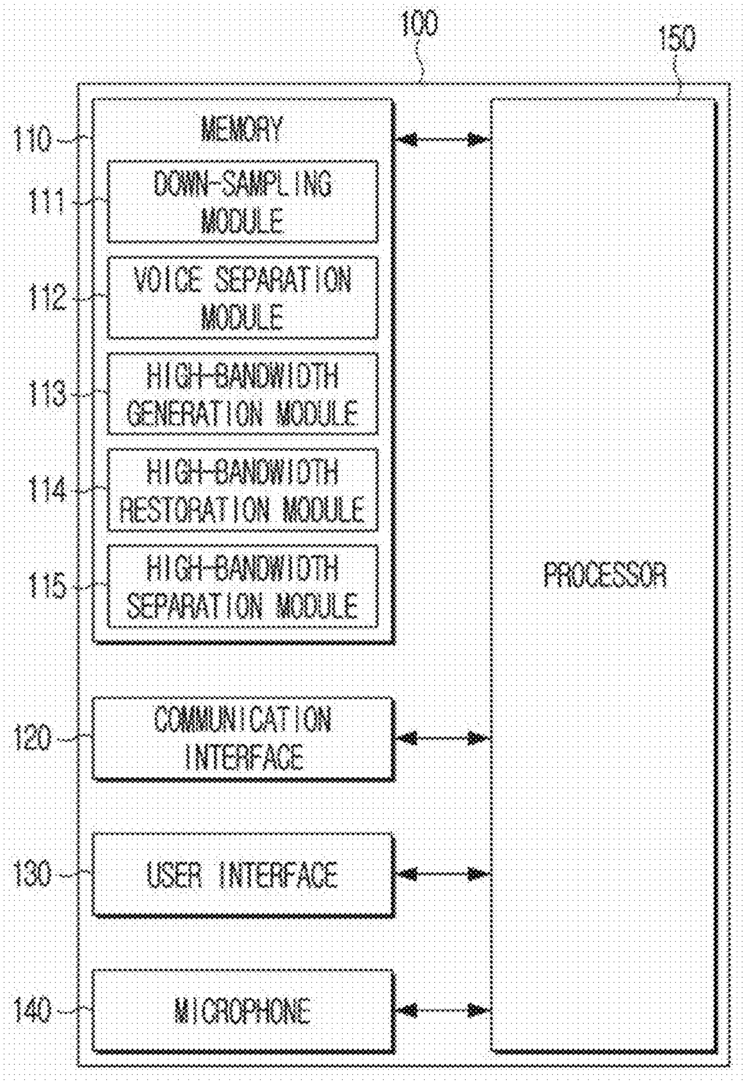
FIG. 1 is a block diagram showing a configuration of an electronic apparatus according to one or more embodiments of the present disclosure.

Since the disclosure may be variously modified and have several exemplary embodiments, specific exemplary embodiments of the disclosure will be illustrated in the drawings and be described in detail in the detailed description. However, it is to be understood that the disclosure are not limited to specific exemplary embodiments, but include all modifications, equivalents, and/or alternatives according to exemplary embodiments of the disclosure. Throughout the accompanying drawings, similar components will be denoted by similar reference numerals.

In describing the disclosure, when it is decided that a detailed description for the known functions or configurations related to the disclosure may unnecessarily obscure the gist of the disclosure, the detailed description therefore will be omitted.

In addition, the following exemplary embodiments may be modified in several different forms, and the scope and spirit of the disclosure are not limited to the following exemplary embodiments. Rather, these exemplary embodiments make the disclosure thorough and complete, and are provided to completely transfer the spirit of the disclosure to those skilled in the art.

Terms used in the disclosure are used only to describe specific exemplary embodiments rather than limiting the scope of the disclosure. Singular forms are intended to include plural forms unless the context clearly indicates otherwise.

In the present disclosure, an expression "have", "may have", "include", "may include", or the like, indicates existence of a corresponding feature (for example, a numerical value, a function, an operation, a component such as a part, or the like), and does not exclude existence of an additional feature.

In the present disclosure, an expression "A or B," "at least one of A and/or B," "one or more of A and/or B," or the like, may include all possible combinations of items enumerated together. For example, "A or B," "at least one of A and B," or "at least one of A or B" may indicate all of 1) a case in which at least one A is included, 2) a case in which at least one B is included, or 3) a case in which both of at least one A and at least one B are included.

Expressions "first", "second", "1st" or "2nd" or the like, used in the present disclosure may indicate various components regardless of a sequence and/or importance of the components, will be used only in order to distinguish one component from the other components, and do not limit the corresponding components.

When it is mentioned that any component (for example: a first component) is (operatively or communicatively) coupled with/to or is connected to another component (for example: a second component), it is to be understood that any component is directly coupled to another component or may be coupled to another component through the other component (for example: a third component).

On the other hand, when it is mentioned that any component (for example, a first component) is "directly coupled" or "directly connected" to another component (for example, a second component), it is to be understood that the other component (for example, a third component) is not present between any component and another component.

An expression "~configured (or set) to" used in the disclosure may be replaced by an expression, for example, "suitable for," "having the capacity to," "~designed to," "~adapted to," "~made to," or "~capable of" depending on a situation. A term "~configured (or set) to" may not necessarily mean "specifically designed to" in hardware.

Instead, in some situations, an expression "~an apparatus configured to" may mean that the apparatus "is capable of" together with other apparatuses or components. For example, a "processor configured (or set) to perform A, B, and C" may mean a dedicated processor 150 for performing the corresponding operations or a generic-purpose processor 150 (for example, a central processing unit (CPU) or an application processor) that may perform the corresponding operations by executing one or more software programs stored in a memory apparatus.

Elements described as "modules" or "part" may be physically implemented by analog and/or digital circuits including one or more of a logic gate, an integrated circuit, a microprocessor, a microcontroller, a memory circuit, a passive electronic component, an active electronic component, and the like.

Meanwhile, various elements and regions in the drawings are schematically illustrated. Therefore, the spirit of the disclosure is not limited by relatively sizes or intervals illustrated in the accompanying drawings.

Hereinafter, embodiments of the disclosure will be described in detail with reference to the accompanying drawings so that those skilled in the art to which the disclosure pertains may easily practice the disclosure.

FIG. 1 is a block diagram showing a configuration of an electronic apparatus according to one or more embodiments of the present disclosure.

The electronic apparatus 100 may include at least one of a memory 110, a communication interface 120, and a processor 150. The electronic apparatus 100 may further include other components in addition to the above components.

The electronic apparatus 100 may be implemented as a server, but this is only one or more embodiments. The electronic apparatus 100 may be implemented in various forms such as PCs, smartphones, TVs, smart TVs, set-top boxes, mobile phones, personal digital assistants (PDAs), laptops, media players, e-readers, digital broadcasting terminals, navigation, kiosks, MP3 players, wearable devices, home appliances, and other mobiles or non-mobile computing devices.

At least one instruction regarding the electronic apparatus 100 may be stored in the memory 110. The memory 110 may store an operating system (O/S) for driving the electronic apparatus 100. In addition, the memory 110 may store various software programs or applications for operating the electronic apparatus 100 according to various embodiments of the present disclosure. The memory 110 may include a semiconductor memory such as a flash memory, a magnetic storage medium such as a hard disk, or the like.

Specifically, various software modules for operating the electronic apparatus 100 according to various embodiments of the present disclosure may be stored in the memory 110, and the processor 150 may execute various software modules stored in the memory 110 to control the operation of the electronic apparatus 100. That is, the memory 110 may be accessed by the processor 150, and the reading/recording/correction/deletion/update, and the like, of data may be performed by the processor 150.

Meanwhile, in the present disclosure, the term 'memory 110' includes the memory 110, a read only memory (ROM) in the processor 150, a random access memory (RAM), or a memory card (for example, a micro secure digital (SD) card or a memory stick) mounted in the electronic apparatus 100.

In addition, the communication interface 120 includes circuitry and is a component capable of communicating with external devices and servers. The communication interface 120 may communicate with an external device or server based on a wired or wireless communication method. The communication interface 120 may include a Bluetooth module, a Wi-Fi module, an infrared (IR) module, a local area network (LAN) module, an Ethernet module, etc. Here, each communication module may be implemented in the form of at least one hardware chip. The wireless communication module may include at least one communication chip performing communication according to various wireless communication standards such as zigbee, universal serial bus (USB), mobile industry processor interface camera serial interface (MIPI CSI), 3rd generation (3G), 3rd generation partnership project (3GPP), long term evolution (LTE), LTE advanced (LTE-A), 4th generation (4G), 5th generation (5G), and the like, in addition to the communication manner described above. However, this is only an example, and the communication interface 120 may use at least one communication module among various communication modules.

The user interface 130 may be implemented as a device such as a button, a touch pad, a mouse, and a keyboard, or may be implemented as a touch screen capable of performing the above-described display function and manipulation input function together. Here, the button may be various types of buttons such as a mechanical button, a touch pad, a wheel, and the like, formed in any region such as a front surface portion, a side surface portion, a rear surface portion, and the like, of a body appearance of the electronic apparatus 100.

The microphone 140 is a component for receiving a user' voice or other sounds and converting the user's voice or other sounds into audio data. The microphone 140 may receive the user's voice when activated. For example, the microphone 140 may be formed integrally with the electronic apparatus 100 in upper, front, side directions, or the like. The microphone 140 may include various components such as a microphone collecting the user's voice in the analog form, an amplifier circuit amplifying the collected user voice, an A/D conversion circuit sampling the amplified user voice and converting the sampled amplified user voice into a digital signal, and a filter circuit removing noise components from the converted digital signal.

The electronic apparatus 100 may acquire the user's voice through the microphone 140 included in the electronic apparatus 100. Alternatively, the electronic apparatus 100 may acquire the user's voice from an external device equipped with a microphone. Specifically, the microphone may be installed in a separate external device such as a remote control, smartphone, speaker, etc. that transmits signals to the electronic apparatus 100. Here, the microphone provided in the external device may digitize the analog voice signal, and the electronic apparatus 100 may receive the digitized voice signal by performing a communication connection with the external device through the communication interface 120.

According to one or more embodiments of the present disclosure, the microphone 140 may acquire a first audio signal including an audio signal corresponding to the first audio source and an audio signal corresponding to the second audio source.

The processor 150 may control the overall operation and function of the electronic apparatus 100. Specifically, the processor 150 is connected to the configuration of the electronic apparatus 100 including the memory 110, and executes at least one instruction stored in the memory 110 as described above, so the overall operation of the electronic apparatus 100 may be controlled.

The processor 150 may be implemented in various schemes. For example, the processor 150 may be implemented by at least one of, an application specific integrated circuit (ASIC), a logic integrated circuit, an embedded processor, a micom, a microprocessor, a hardware control logic, a hardware finite state machine (FSM), and a digital signal processor 150.

In particular, the processor 150 may include one or more processors. In detail, one or more processors may include one or more of a central processing unit (CPU), a graphics processing unit (GPU), an accelerated processing unit (APU), a many integrated core (MIC), a digital signal processor (DSP), a neural processing unit (NPU), a main processing unit (MPU), a hardware accelerator, or a machine learning accelerator. One or more processors may control one or any combination of other components of the electronic apparatus and may perform operations related to communication or data processing. One or more processors may execute one or more programs or instructions stored in memory. For example, one or more processors 150 may perform the method according to one or more embodiments of the present disclosure by executing one or more instructions stored in the memory.

When the method according to one or more embodiments of the present disclosure includes a plurality of operations, the plurality of operations may be performed by one processor or by a plurality of processors. That is, when a first operation, a second operation, and a third operation are performed by the method according to one or more embodiments, the first operation, the second operation, and the third operation may all be performed by a first processor, the first operation and the second operation may be performed by the first processor 150, and the third operation may also be performed by a second processor 150.

The one or more processors may be implemented as a single core processor 150 including one core, or one or more multicore processors 150 including a plurality of cores (e.g., homogeneous multicore or heterogeneous multicore). When one or more processors are implemented as a multicore processor, each of the plurality of cores included in the multicore processor may include an internal memory of the processor such as a cache memory and an on-chip memory, and a common cache shared by a plurality of cores may be included in a multicore processor. In addition, each of the plurality of cores (or some of the plurality of cores) included in the multi-core processor may read and perform program instructions for independently implementing the method according to one or more embodiments of the present disclosure, and all (or part) of the plurality of cores may be linked to read and perform program instructions for implementing the method according to one or more embodiments of the present disclosure.

When the method according to one or more embodiments of the present disclosure includes a plurality of operations, the plurality of operations may be performed by one of a plurality of cores included in a multicore processor, or may be performed by the plurality of cores. For example, when the first operation, the second operation, and the third operation are performed by the method according to one or more embodiments, the first operation, the second operation, and the third operation may all be performed by the first processor in the multicore processor, the first operation and the second operation may be performed by a first core included in the multicore processor, and the third operation may be performed by a second core included in the multi-core processor.

In one or more embodiments of the present disclosure, the processor 150 may be a system-on-chip (SoC) in which one or more processors and other electronic components are integrated, a single-core processor, a multi-core processor, or a core included in the single-core processor or the multi-core processor. Here, the core may be implemented as CPU, GPU, APU, MIC, DSP, NPU, a hardware accelerator, a machine learning accelerator, or the like, but embodiments of the present disclosure are not limited thereto.

Operations of the processor 150 for implementing various embodiments of the present disclosure may be implemented through a plurality of modules.

Specifically, data for a plurality of modules according to the present disclosure may be stored in the memory 110, and the processor 150 may access the memory 110 to load the data for a plurality of modules into the memory or buffer inside the processor 150 and then use the plurality of modules, thereby implementing various embodiments according to the present disclosure. In this case, the plurality of modules may include a down-sampling module 111, a voice separation module 112, a high-bandwidth generation module 113, a high-bandwidth restoration module 114, and a high-bandwidth separation module 115.

However, at least one of the plurality of modules according to the present disclosure may be implemented as hardware and may be included in the processor 150 in the form of a system on chip.

Alternatively, at least one of the plurality of modules according to the present disclosure may be implemented as a separate external device, and the electronic apparatus 100 and each module may perform communication and perform operations according to the present disclosure.

Hereinafter, the operation of the processor 150 according to the present disclosure will be described in detail with reference to the attached drawings.

Figure 2:
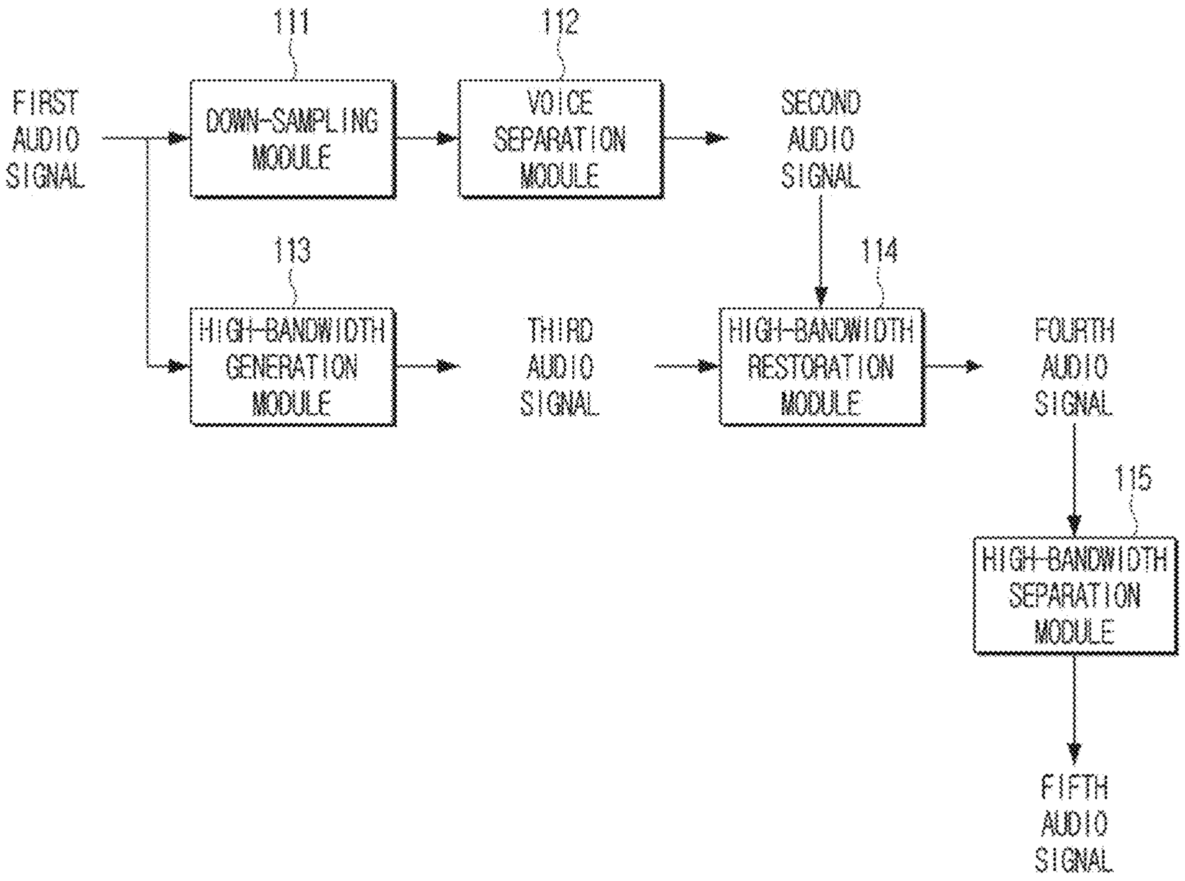
FIG. 2 is a diagram showing an operation of a plurality of modules according to one or more embodiments of the present disclosure.

FIG. 2 is a diagram showing an operation of a plurality of modules according to one or more embodiments of the present disclosure.

Referring to FIG. 2, the electronic apparatus 100 may acquire a first audio signal including an audio signal corresponding to a first audio source and an audio signal corresponding to a second audio source. That is, the first audio signal may be a signal including the audio signal corresponding to the first audio source and the audio signal corresponding to the second audio source. Here, the first audio source may refer to first user' utterance, and the second audio source may refer to second user's utterance.

In other words, the electronic apparatus 100 may acquire a first audio signal including a first user's voice and a second user's voice.

The electronic apparatus 100 of the present disclosure may acquire the first audio signal through the microphone 140 while the first user and the second user utter. Alternatively, the electronic apparatus 100 may receive the first audio signal from the external device through the communication interface 120.

The first audio signal may include components in a first frequency bandwidth. For example, the first frequency bandwidth may be 0 kHz to 48 KHz.

Figure 3:
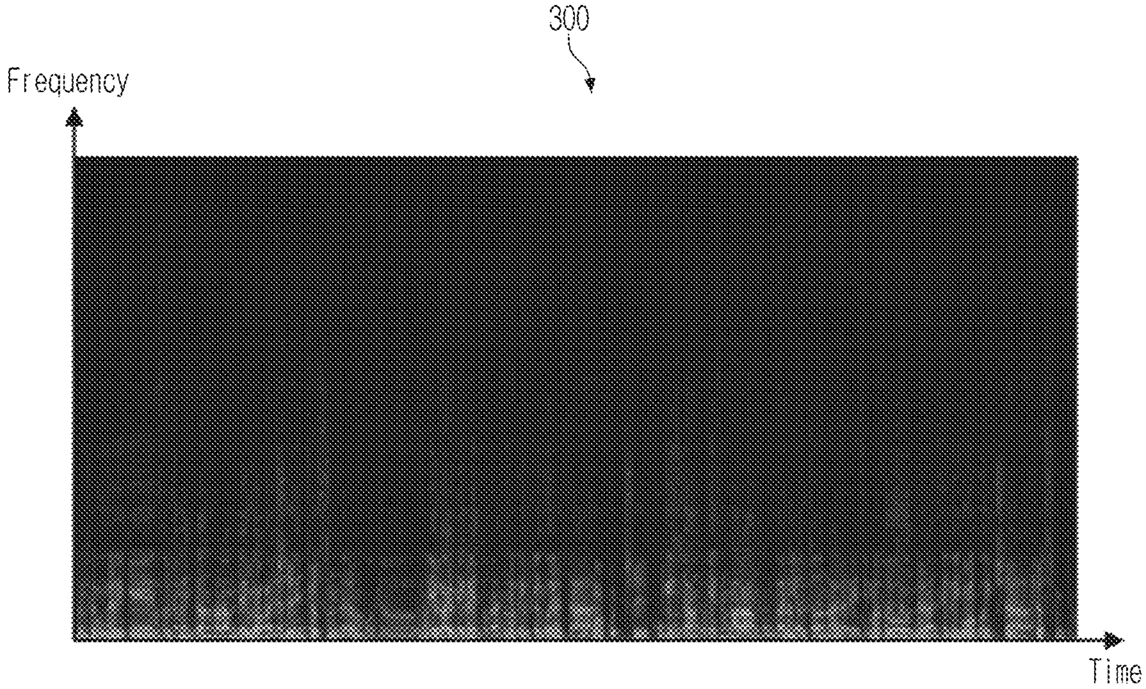
FIG. 3 is a diagram showing a first audio signal according to one or more embodiments of the present disclosure.

Referring to FIG. 3, a first audio signal 300 may be expressed in the form of a spectrogram as illustrated in FIG. 3.

The electronic apparatus 100 may separate a signal corresponding to the first audio source in a bandwidth below the preset frequency from the first audio signal to acquire a second audio signal.

Specifically, the electronic apparatus 100 may input the first audio signal to the down-sampling module 111 to down-sample the first audio signal.

Figure 4:
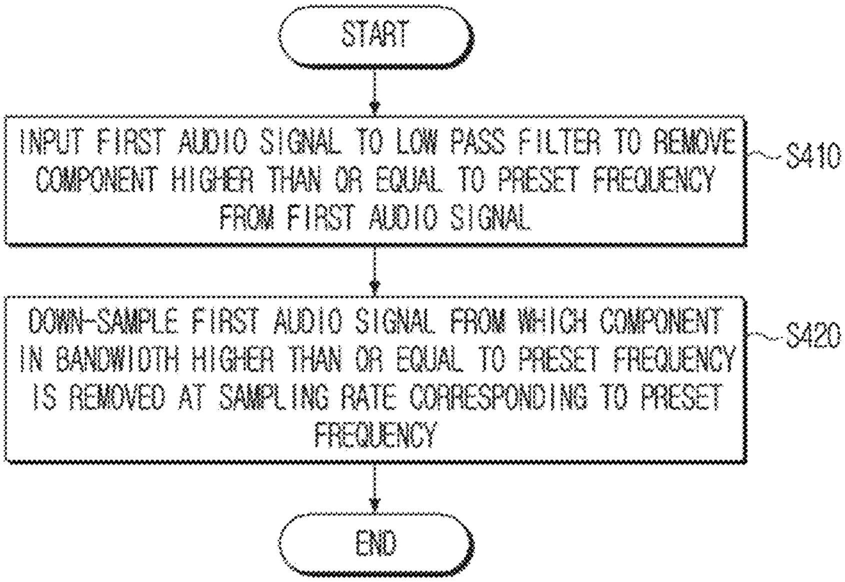
FIG. 4 is a flowchart showing a method of down-sampling, by a down-sampling module, a first audio signal according to one or more embodiments of the present disclosure.

FIG. 4 is a flowchart showing a method of down-sampling, by a down-sampling module, a first audio signal according to one or more embodiments of the present disclosure.

Referring to FIG. 4, the down-sampling module may input the first audio signal to a low pass filter to remove components in a bandwidth higher than or equal to a preset frequency from the first audio signal (S410). That is, the electronic apparatus 100 may input the first audio signal to the low-pass filter to acquire an audio signal including components in the bandwidth below the preset frequency from the first audio signal.

In the present disclosure, the bandwidth below the preset frequency may be referred to as low-bandwidth. The bandwidth that is higher than or equal to the preset frequency may be referred to as high-bandwidth.

For example, the preset frequency may be 16 kHz. In this case, the bandwidth (low-bandwidth) below the preset frequency may be 0 kHz to 16 kHz. The bandwidth (high-bandwidth) higher than or equal to the preset frequency may be 16 kHz to 48 KHz.

That is, the electronic apparatus 100 may acquire an audio signal from which the high-bandwidth components of the first audio signal are removed and including low-bandwidth components of the first audio signal.

For example, the electronic apparatus 100 may acquire the first audio signal from which components in a frequency bandwidth of 8 kHz to 48 KHz are removed from the first audio signal including components in a frequency bandwidth of 0 kHz to 48 KHz.

In addition, the down-sampling module 111 may down-sample the first audio signal from which the high-bandwidth components are removed.

In this case, the down-sampling module 111 may down-sample the first audio signal from which the components in the bandwidth (i.e., high-bandwidth) higher than or equal to the preset frequency are removed at a sampling rate corresponding to the preset frequency (S420).

Specifically, the electronic apparatus 100 may down-sample the first audio signal from which the high-bandwidth components are removed at a ratio between a maximum frequency of the first audio signal and the preset frequency.

In other words, the electronic apparatus 100 may down-sample the first audio signal from which the high-bandwidth components are removed at a ratio between the maximum frequency of the high-bandwidth and the maximum frequency of the low-bandwidth (i.e., preset frequency).

For example, the high-bandwidth may be 16 kHz to 48 kHz, and the low-bandwidth may be 0 kHz to 16 kHz. In this case, the maximum frequency of the high-bandwidth may be 48 kHz, and the maximum frequency of the low-bandwidth may be 16 kHz. In this case, the electronic apparatus 100 may down-sample the first audio signal from which the high-bandwidth components are removed at a 3:1 ratio, which is a 48 KHz: 16 kHz ratio.

Figure 5:
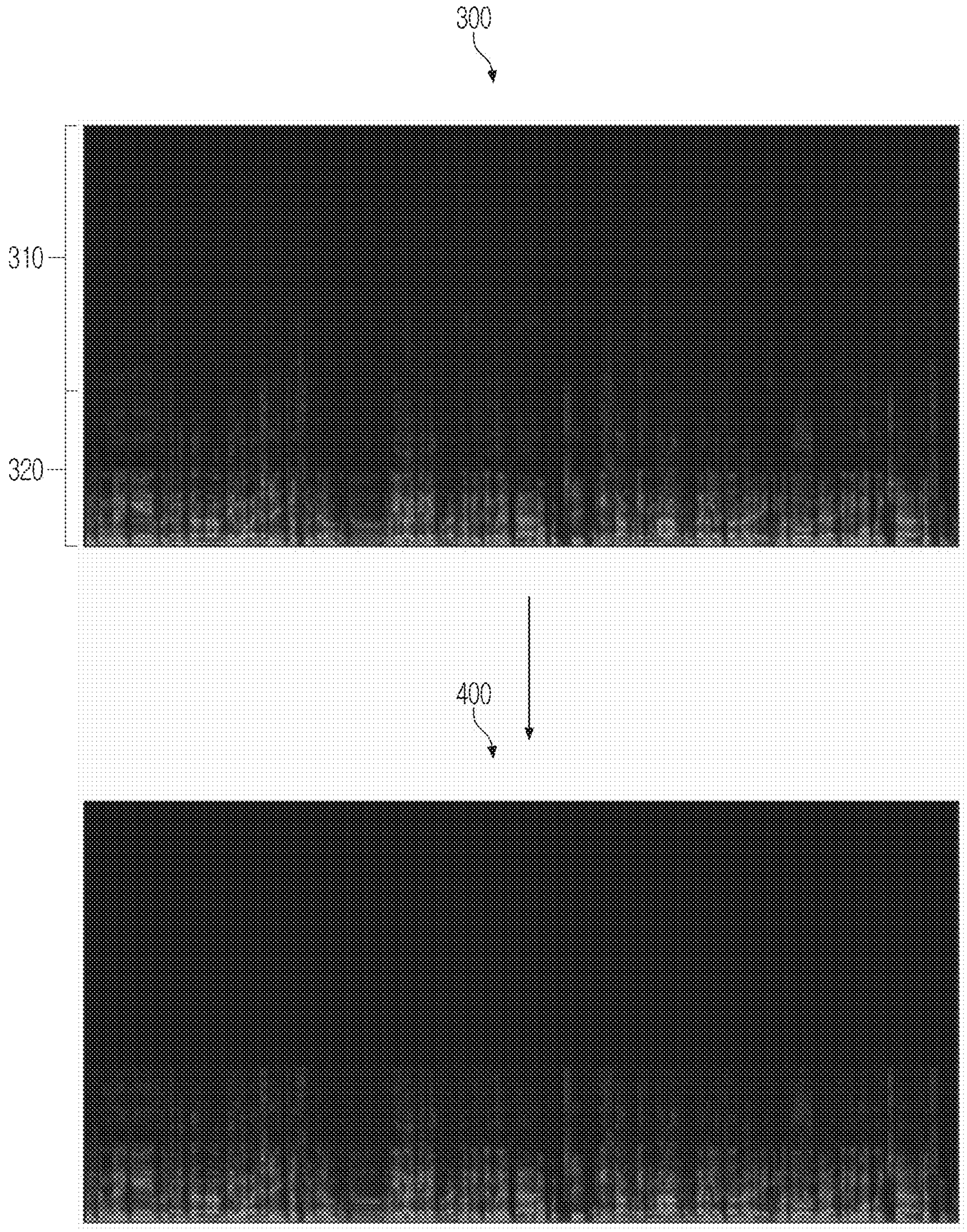
FIG. 5 is a diagram showing a method of acquiring, by an electronic apparatus, a first audio signal from which high-bandwidth components are removed according to one or more embodiments of the present disclosure.

Referring to FIG. 5, the electronic apparatus 100 may acquire, from the first audio signal 300, a second audio signal 400 in which a low-bandwidth component 410 is maintained and from which a high-bandwidth component 420 is removed.

Referring back to FIG. 2, the electronic apparatus 100 may input the first audio signal down-sampled by the down-sampling module 111 to the voice separation module 112.

The voice separation module 112 may input the down-sampled first audio signal into a neural network model to acquire the second audio signal including the audio signal corresponding to the first audio source.

In the present disclosure, based on an audio signal including audio signals corresponding to a plurality of audio sources being input, the neural network model may be trained to separate and output audio signals corresponding to each of the plurality of audio sources.

That is, based on the audio signal including the audio signal corresponding to the first audio source and the audio signal corresponding to the second audio source being input, the neural network model may be trained to output the audio signal corresponding to the first audio source and the audio signal corresponding to the second audio source.

In the present disclosure, the neural network model may be implemented in the form of a Depp Neural Network including an input layer, a hidden layer, and an output layer.

The neural network model may be stored in the memory 110. Alternatively, the neural network model may be stored in an external device. In this case, the voice separation module 112 may transmit the down-sampled first audio signal to the external device and receive the second audio signal generated by the neural network model stored in the external device from the external device.

Referring back to FIG. 2, the electronic apparatus 100 may input the first audio signal to the high-bandwidth generation module 113 to acquire the audio signal that includes the components in the bandwidth (i.e., high-bandwidth) that is higher than or equal to the preset frequency of the first audio signal.

Figure 6:
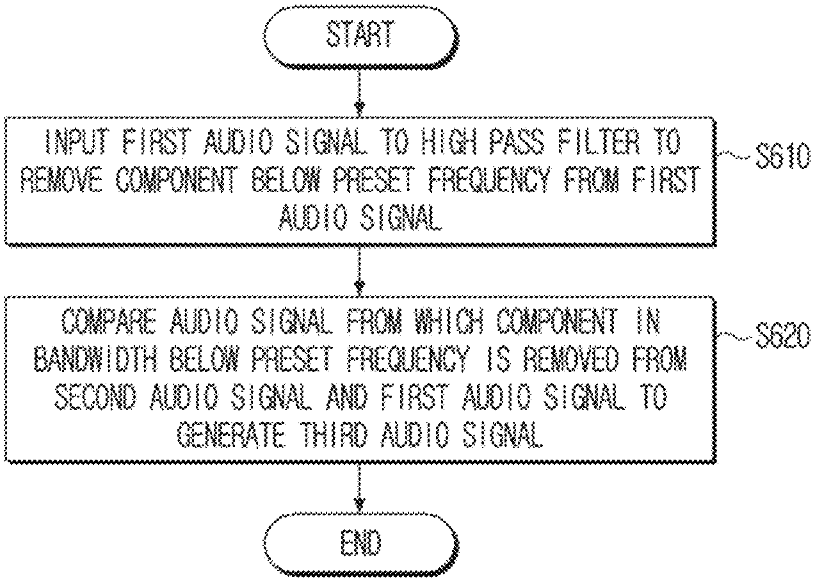
FIG. 6 is a flowchart showing a method of acquiring, by an electronic apparatus, a third audio signal according to one or more embodiments of the present disclosure.

FIG. 6 is a flowchart showing a method of acquiring, by a high-bandwidth generation module 113, a third audio signal according to one or more embodiments of the present disclosure.

Referring to FIG. 6, the high-bandwidth generation module 113 may input the first audio signal to a high pass filter and remove the component below the preset frequency from the first audio signal (S610). That is, the high-bandwidth generation module 113 may input the first audio signal to the high-pass filter to acquire the audio signal including the components higher than or equal to the preset frequency from the first audio signal.

In other words, the high-bandwidth generation module 113 may acquire the audio signal from which the low-bandwidth components of the first audio signal are removed and including the high-bandwidth components of the first audio signal.

In addition, the high-bandwidth generation module 113 may extract features of the audio signal from which the components in the band below the preset frequency have been removed from the first audio signal, and generate the third audio signal using the extracted features (S620). In this case, the third audio signal may include both the audio signal corresponding to the first audio source and the audio signal corresponding to the second audio source.

Specifically, the third audio signal may be generated by comparing the second audio signal that corresponds to the first audio source and includes the audio signal of the low-bandwidth component and the audio signal from which the low-bandwidth component is removed in the first audio signal.

In this case, the high-bandwidth generation module 113 may acquire the features of the audio signal from which the low-bandwidth component is removed based on the second audio signal.

In this case, the high-bandwidth generation module 113 may acquire the features of the energy of the audio signal from which the low-bandwidth component is removed based on the energy of the second audio signal. Specifically, the high-bandwidth generation module 113 may acquire the information on the difference between the energy of the second audio signal and the energy of the audio signal from which the low-bandwidth component is removed.

In addition, the high-bandwidth generation module 113 may acquire features of the tonality of the audio signal from which the low-bandwidth components are removed based on tonality of the second audio signal. Specifically, the high-bandwidth generation module 113 may acquire the information on the difference between the tonality of the second audio signal and the tonality of the audio signal from which the low-bandwidth component is removed.

In addition, the high-bandwidth generation module 113 may acquire features of harmonic of the audio signal from which the low-bandwidth components are removed based on harmonic of the second audio signal. Specifically, the high-bandwidth generation module 113 may acquire the information on the difference between the harmonic of the second audio signal and the harmonic of the audio signal from which the low-bandwidth component is removed.

In other words, the high-bandwidth generation module 113 can extract features of the audio signal from which the low-bandwidth components are removed and parameterize the audio signal from which the low-bandwidth components are removed. In addition, the high-bandwidth generation module 113 may generate the third audio signal based on the parameters of the audio signal from which the low-bandwidth components are removed.

Meanwhile, according to one or more embodiments of the present disclosure, the operation S620 may be omitted. In this case, the third audio signal may be the audio signal in which the components in the band lower than the preset frequency are removed from the first audio signal acquired in operation S610.

Referring back to FIG. 2, the electronic apparatus 100 may input the second audio signal and the third audio signal to the high-bandwidth restoration module 114. In addition, the high-bandwidth restoration module 114 may combine the second and third audio signals to acquire a fourth audio signal.

Figure 7:
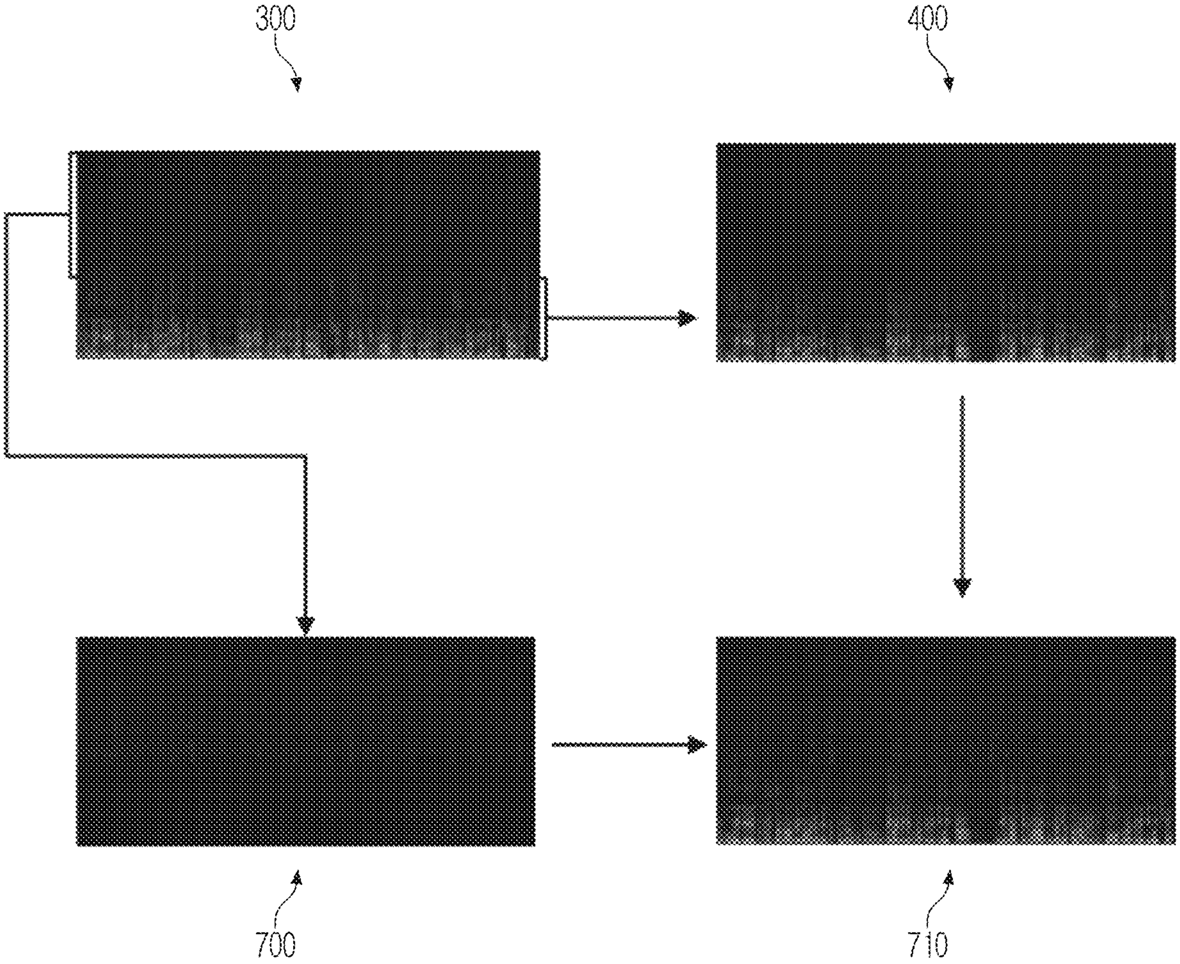
FIG. 7 is a diagram showing a method of acquiring, by an electronic apparatus, a fourth audio signal according to one or more embodiments of the present disclosure.

Referring to FIG. 7, the high-bandwidth restoration module 114 may combine the second audio signal 400 corresponding to the first audio source and including the low-bandwidth component and a third audio signal 700 acquired by separating the components in the bandwidth higher than or equal to the preset frequency from the first audio signal 300 to acquire a fourth audio signal 710 from the first audio signal 300.

In this case, the component in the bandwidth (low-bandwidth) below the preset frequency in the fourth audio signal 710 may include the audio signal corresponding to the first audio source. Further, the component in the bandwidth (high-bandwidth) higher than or equal to the preset frequency in the fourth audio signal may include the audio signal corresponding to the first audio source and the audio signal corresponding to the second audio source. Accordingly, since the audio sources including the low-bandwidth components and the high-bandwidth components in the fourth audio signal are different, the high-band component of the fourth audio signal may include noise. Here, the noise may be an audio signal corresponding to the second audio source in the high-bandwidth component of the fourth audio signal. In other words, the high-bandwidth component of the fourth audio signal may be a distorted signal.

Referring back to FIG. 2, the electronic apparatus 100 may input the fourth audio signal to the high-bandwidth restoration module 114 and remove the component corresponding to the second audio source from the high-bandwidth component of the fourth audio signal. Accordingly, the high-bandwidth restoration module 114 may acquire a fifth audio signal from which the component corresponding to the second audio source is removed from the high-bandwidth component of the fourth audio signal.

Specifically, the high-bandwidth restoration module 114 may frequency-analyze each of the plurality of frames included in the fourth audio signal to identify whether to remove the high-bandwidth component from each of the plurality of frames. In this case, the high-bandwidth restoration module 114 may perform Fourier transform on each of the plurality of frames of the fourth audio signal and perform frequency analysis on each of the plurality of frames.

Figure 8:
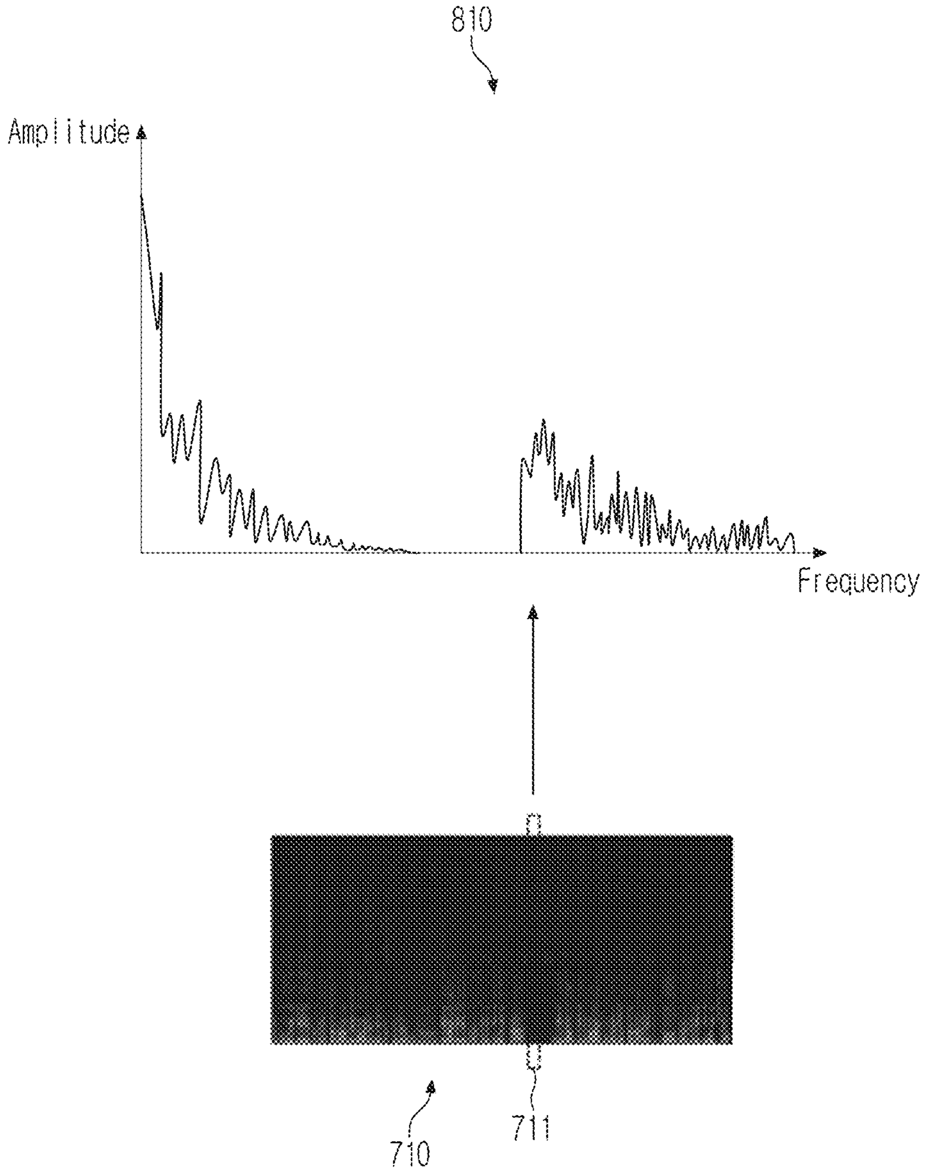
FIG. 8 is a diagram showing a method of acquiring, by an electronic apparatus, a fifth audio signal according to one or more embodiments of the present disclosure.

For example, referring to FIG. 8, an audio signal 810 in a first frame 711 among the plurality of frames included in the fourth audio signal 710 may be as illustrated in FIG. 8.

Figure 9:
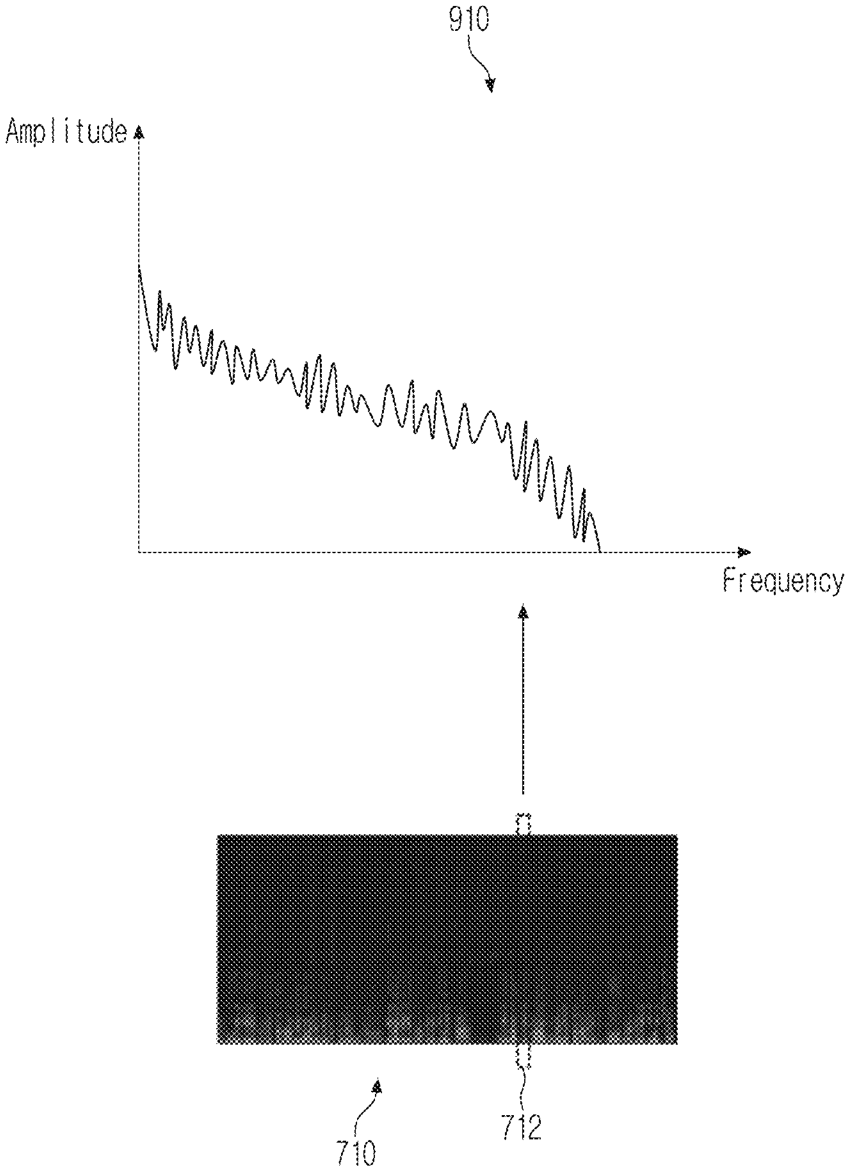
FIG. 9 is a diagram showing a method of acquiring, by an electronic apparatus, a fifth audio signal according to one or more embodiments of the present disclosure.

For example, referring to FIG. 9, an audio signal 910 in the second frame 712 among the plurality of frames included in the fourth audio signal 710 may be as illustrated in FIG. 9.

According to one or more embodiments of the present disclosure, the high-bandwidth restoration module 114 may remove the high-bandwidth distortion by comparing the low-bandwidth energy and high-bandwidth energy in the fourth audio signal.

Specifically, the electronic apparatus 100 may obtain a fifth audio signal by removing the components in the band higher than or equal to the preset frequency from each of the plurality of frames constituting the fourth audio signal, based on the energy of the component in the bandwidth below the preset frequency being less than the energy of the component in the band higher than or equal to the preset frequency.

That is, the frame where the energy of the components in the bandwidth below the preset frequency is less than the energy of the components in the bandwidth higher than or equal to the preset frequency may be a frame in which there is no or little audio signal corresponding to the first audio source and the audio signal corresponding to the second audio source is in the high-bandwidth. In this case, the high-bandwidth restoration module 114 may remove the audio signal corresponding to the second audio source in the frame in which there is no or little audio signal corresponding to the first audio source and the audio signal corresponding to the second audio source is present in the high-bandwidth.

Here, the bandwidth below the preset frequency may range from 0 kHz to the preset frequency. For example, the bandwidth below the preset frequency may be 0 kHz to 16 kHz.

Figure 10:
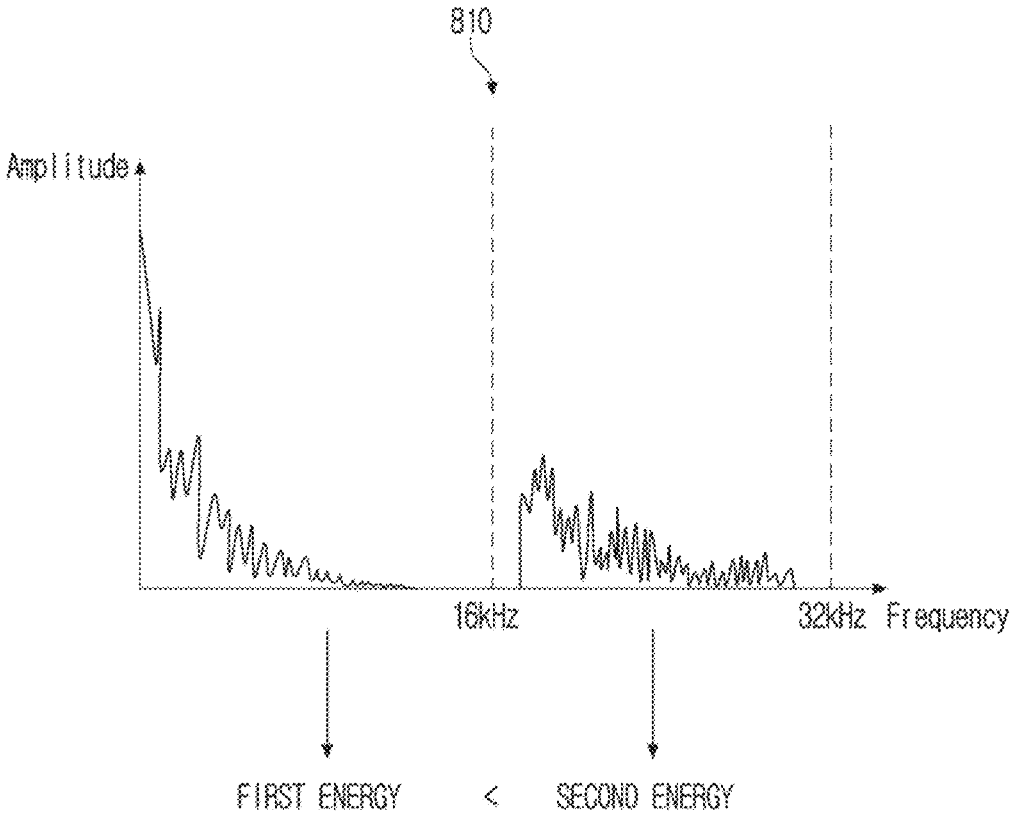
FIG. 10 is a diagram showing a method of acquiring, by an electronic apparatus, a fifth audio signal according to one or more embodiments of the present disclosure.

For example, referring to FIG. 10, in a first frame among the plurality of frames constituting the fourth audio signal, the high-bandwidth restoration module 114 may compare first energy of components included in a frequency bandwidth of 0 kHz to 16 kHz below the preset frequency of 16 kHz and second energy of components included in a frequency bandwidth of 16 kHz to 48 kHz higher than or equal to a preset frequency of 16 kHz. In this case, the first energy may be smaller than the second energy.

In this case, based on the first energy being smaller than the second energy, the high-bandwidth restoration module 114 may remove the components in the bandwidth higher than or equal to 8 kHz from the first frame. That is, the audio signal corresponding to the second audio source included in the high-bandwidth in the first frame may be removed.

Figure 11:
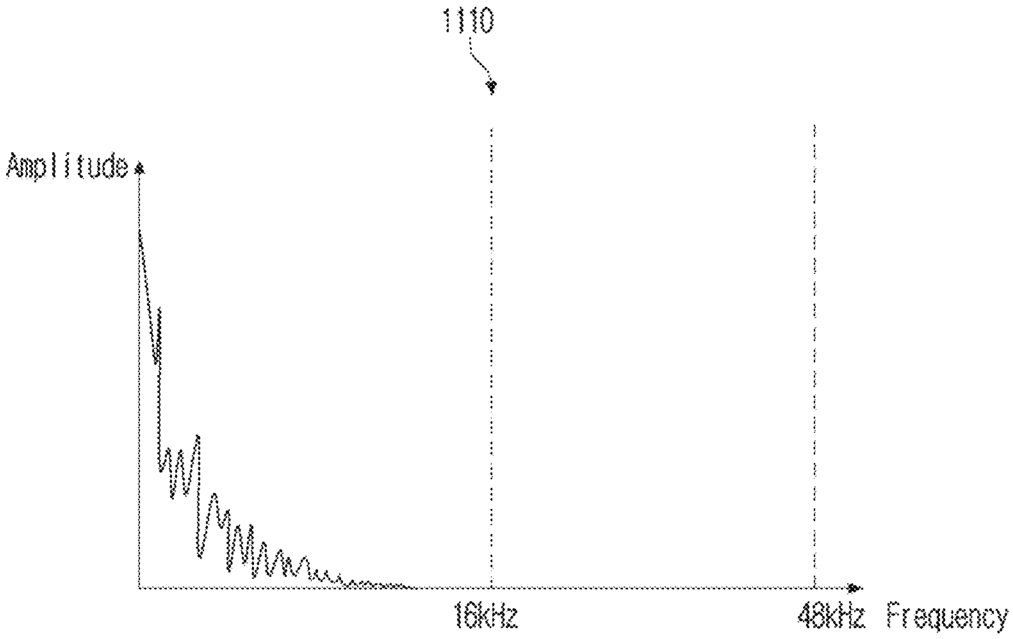
FIG. 11 is a diagram showing a method of acquiring, by an electronic apparatus, a fifth audio signal according to one or more embodiments of the present disclosure.

Accordingly, referring to FIG. 11, an audio signal 1110 in the first frame may be converted as illustrated in FIG. 11.

Meanwhile, the bandwidth below the preset frequency may refer to a bandwidth in which a specific frequency bandwidth is excluded from among the frequency bandwidth below the preset frequency. The preset frequency as described above may be referred to as the preset first frequency. In this case, the bandwidth below the preset frequency may range from the preset second frequency to the preset first frequency. For example, the bandwidth below the preset frequency may be 8 kHz to 16 KHz.

Figure 12:
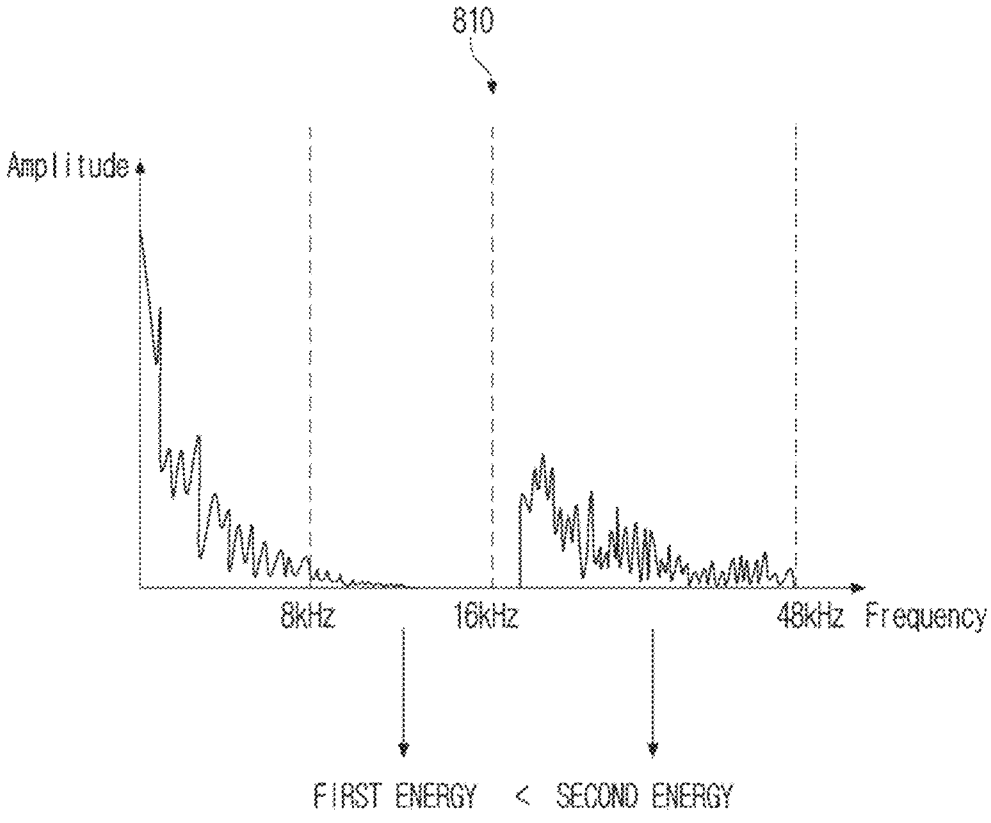
FIG. 12 is a diagram showing a method of acquiring, by an electronic apparatus, a fifth audio signal according to one or more embodiments of the present disclosure.

For example, referring to FIG. 12, the high-bandwidth restoration module 114 may compare the first energy of the component included in the frequency bandwidth of 8 kHz to 16 kHz and the second energy of the component included in the frequency bandwidth of 8 kHz to 48 kHz in the first frame constituting the fourth audio signal.

In this case, based on the first energy being smaller than the second energy, the high-bandwidth restoration module 114 may remove the components in the bandwidth higher than or equal to 8 kHz from the first frame. That is, the audio signal corresponding to the second audio source included in the high-bandwidth in the first frame may be removed.

Figure 13:
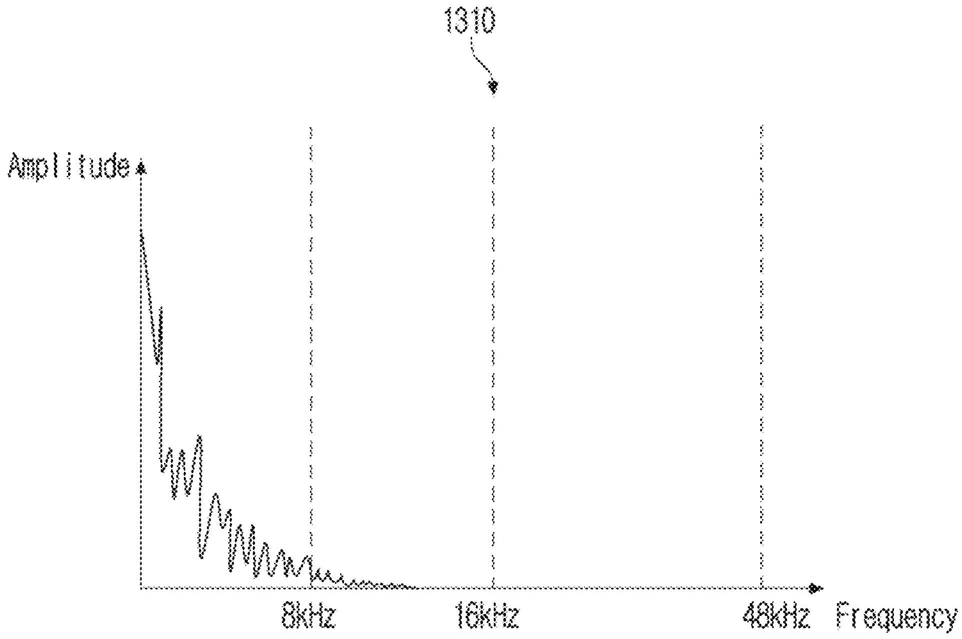
FIG. 13 is a diagram showing a method of acquiring, by an electronic apparatus, a fifth audio signal according to one or more embodiments of the present disclosure.

Accordingly, referring to FIG. 13, an audio signal 1310 in the first frame may be converted as illustrated in FIG. 13.

Meanwhile, based on the first energy being greater than the second energy in a second frame among the plurality of frames included in the fourth audio signal, the high-bandwidth restoration module 114 may maintain components included in the high-bandwidth in the second frame without removing the components.

Figure 14:
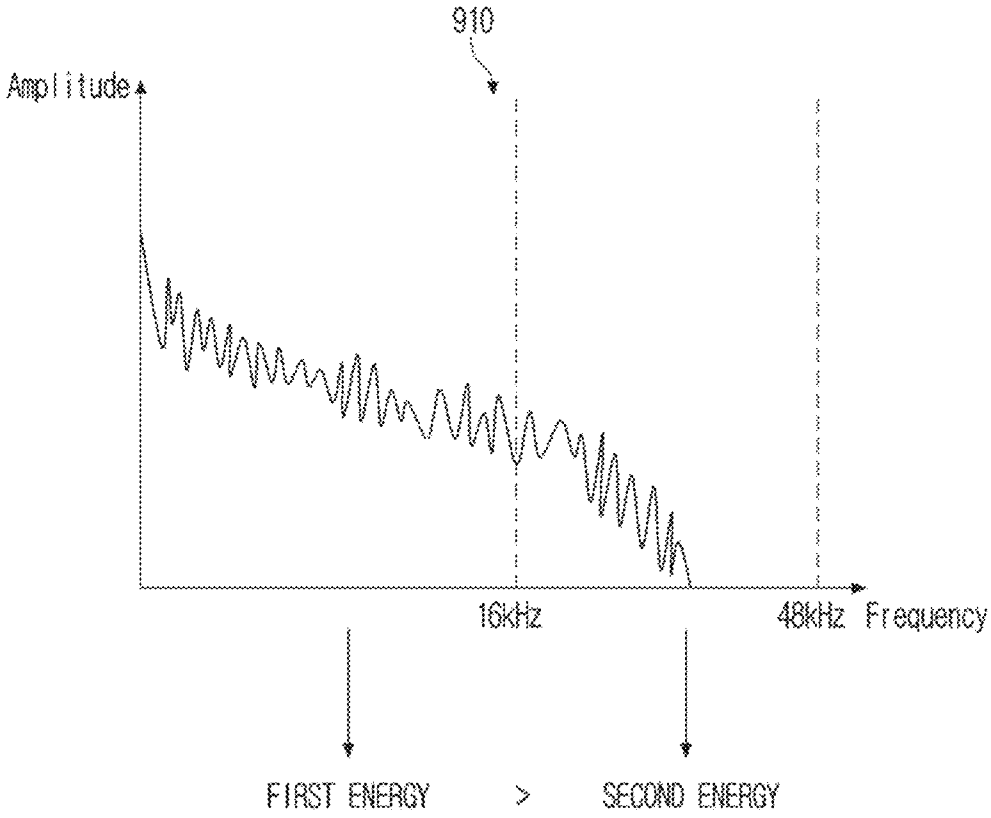
FIG. 14 is a diagram showing a method of acquiring, by an electronic apparatus, a fifth audio signal according to one or more embodiments of the present disclosure.

For example, referring to FIG. 14, in the second frame among the plurality of frames constituting the fourth audio signal, the high-bandwidth restoration module 114 may compare first energy of components included in a frequency bandwidth of 0 kHz to 16 kHz below the preset frequency of 16 kHz and second energy of components included in a frequency bandwidth of 16 kHz to 48 KHz higher than or equal to a preset frequency of 16 kHz. In this case, the first energy may be greater than the second energy.

Based on the second energy being greater than the first energy, the high-bandwidth restoration module 114 may maintain components included in the high-bandwidth in the second frame without removing the components. That is, the frame in which the first energy is greater than the second energy may be a frame in which the signals corresponding to the first audio source are included in both the low-bandwidth and the high-bandwidth. Accordingly, the high-bandwidth restoration module 114 may maintain the signal corresponding to the first audio source included in the high-bandwidth.

Figure 15:
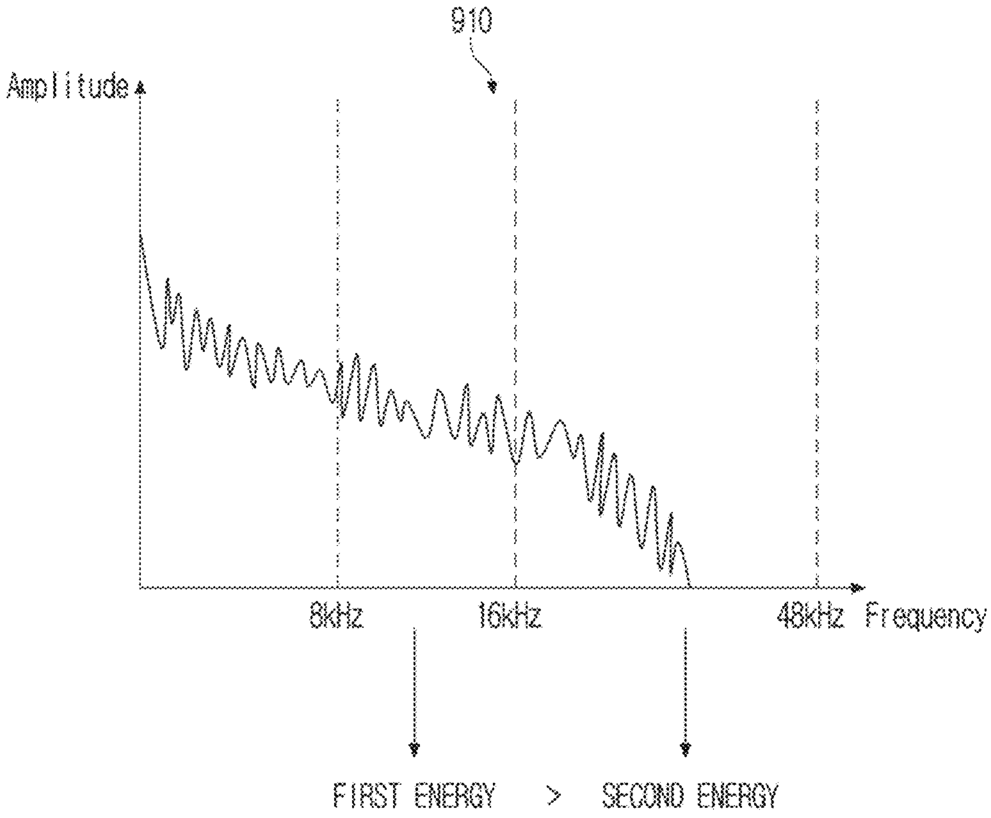
FIG. 15 is a diagram showing a method of acquiring, by an electronic apparatus, a fifth audio signal according to one or more embodiments of the present disclosure.

Similarly, referring to FIG. 15, the high-bandwidth restoration module 114 may compare the first energy of the component included in the frequency bandwidth of 8 kHz to 16 kHz and the second energy of the component included in the frequency bandwidth of 8 kHz to 48 kHz in the first frame constituting the fourth audio signal. In this case, based on the second energy being greater than the first energy, the high-bandwidth restoration module 114 may maintain the components included in the high-bandwidth without removing the components.

Meanwhile, according to one or more embodiments of the present disclosure, in addition to the energy comparison method described above, the electronic apparatus 100 may remove the audio signal corresponding to the second audio source by analyzing the pattern of the audio signal graph.

Specifically, based on the preset pattern being identified for each of the plurality of frames constituting the fourth audio signal, the high-bandwidth restoration module 114 may remove the components included in the bandwidth higher than or equal to the preset frequency to acquire the fifth audio signal.

For example, referring to FIG. 16, based on a value representing a similarity between a shape of the component included in the bandwidth (low-bandwidth) below the preset frequency and a shape of a quadrant 1610 being greater than or equal to the preset value, the high-bandwidth restoration module 114 may remove the components included in the bandwidth higher than or equal to the preset frequency to acquire the fifth audio signal. Meanwhile, the shape to be compared with the shape of the graph in the components included in the low-bandwidth may be implemented in various forms such as a triangle or a semicircle in addition to the shape of the quadrant 1610.

In this case, based on the value representing the similarity between the shape of the graph and the shape of the quadrant 1610 in the component included in the bandwidth less than the preset frequency being less than the preset value, the high-band restoration module 114 may maintain the components included in the bandwidth higher than or equal to the preset frequency without removing the components to acquire the fifth audio signal.

Figure 16:
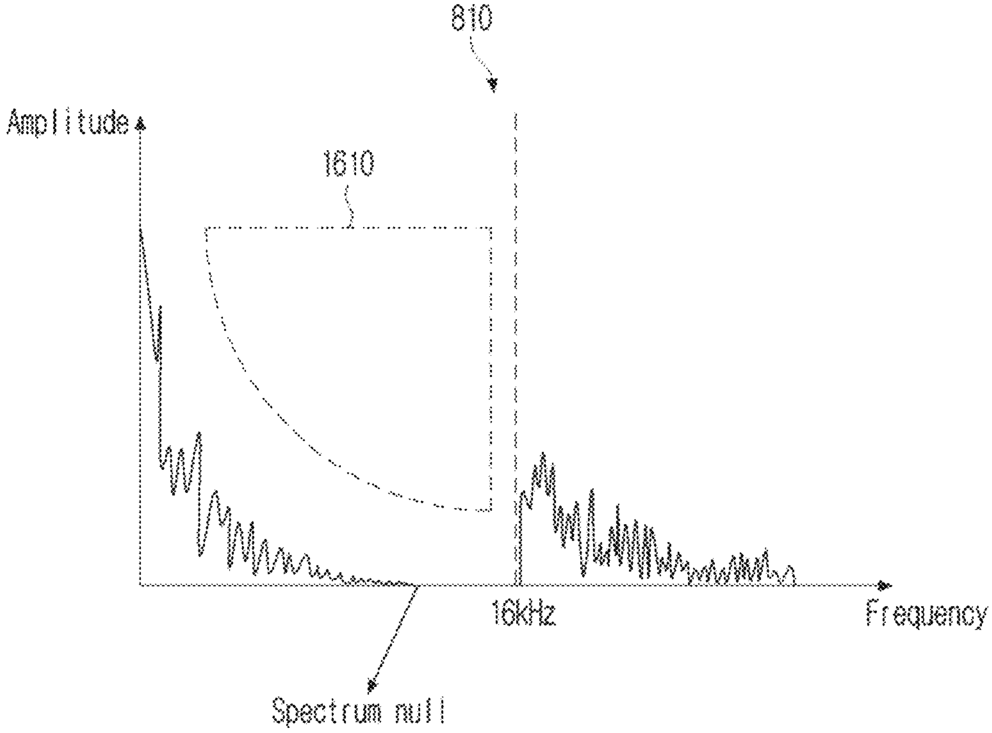
FIG. 16 is a diagram showing a method of acquiring, by an electronic apparatus, a fifth audio signal according to one or more embodiments of the present disclosure.

Alternatively, referring to FIG. 16, based on there being a component (spectrum null) whose amplitude value is 0 in the component included in the bandwidth less than the preset frequency, the high-bandwidth restoration module 114 may remove the components included in the bandwidth higher than or equal to the preset frequency to acquire the fifth audio signal.

In this case, based on there being no point where the amplitude value is 0 in the component included in the bandwidth less than the preset frequency, the high-band restoration module 114 may acquire the fifth audio signal by maintaining the components included in the bandwidth higher than or equal to the preset frequency without removing the components.

Meanwhile, a first method of identifying whether to remove the components included in the high-bandwidth by comparing the energy between the low-bandwidth and the high-bandwidth described above and a second method of analyzing the pattern of the audio signal graph may be used together.

For example, based on the energy of the component included in the high-bandwidth being greater than the energy of the component included in the low-bandwidth and the preset pattern is identified together, the high-bandwidth restoration module 114 may remove the audio signal of the components included in the high-bandwidth to acquire the fifth audio signal.

Figure 17:
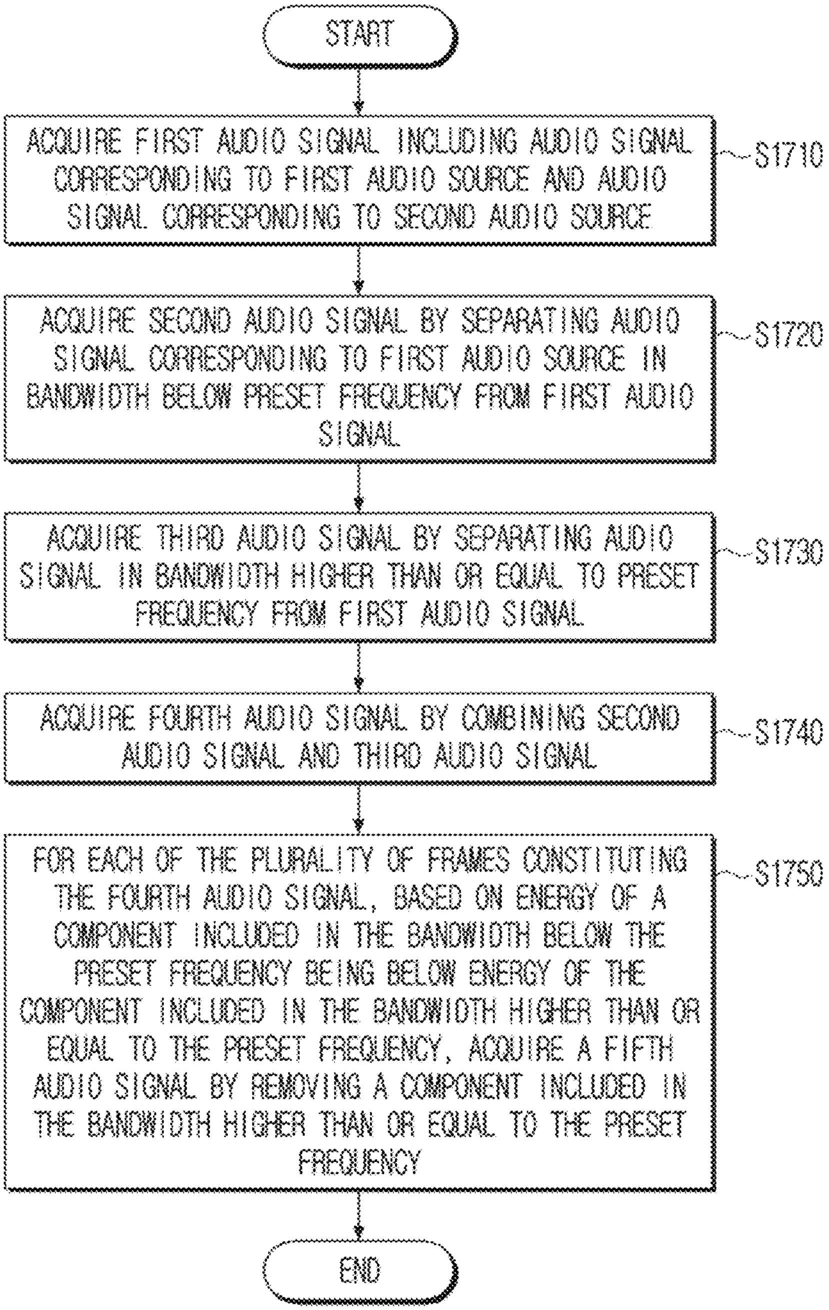
FIG. 17 is a flowchart showing a controlling method of an electronic apparatus according to one or more embodiments of the present disclosure.

FIG. 17 is a flowchart showing a controlling method of an electronic apparatus 100 according to one or more embodiments of the present disclosure.

The electronic apparatus 100 may acquire the first audio signal including the audio signal corresponding to the first audio source and the audio signal corresponding to the second audio source (S1710).

The electronic apparatus 100 may separate the audio signal corresponding to the first audio source in the bandwidth below the preset frequency from the first audio signal to acquire the second audio signal (S1720).

Specifically, the electronic apparatus 100 may down-sample the first audio signal at the sampling rate corresponding to the preset frequency, and separate the audio signal corresponding to the first audio source by inputting the down-sampled first audio signal to the neural network model to acquire the second audio signal.

The electronic apparatus 100 may separate the audio signal in the bandwidth higher than or equal to the preset frequency from the first audio signal to acquire the third audio signal (S1730).

Specifically, the electronic apparatus 100 may acquire the features of the bandwidth higher than or equal to the preset frequency from the first audio signal based on the second audio signal, and acquire the third audio signal using the acquired features.

The electronic apparatus 100 may combine the second and third audio signals to acquire the fourth audio signal (S1740).

The electronic apparatus 100 may remove the components included in the bandwidth higher than or equal to the preset frequency to acquire the fifth audio signal from each of the plurality of frames constituting the fourth audio signal, based on the energy of the component included in the bandwidth below the preset frequency being less than the energy of the component included in the bandwidth higher than or equal to the preset frequency (S1750).

In this case, the bandwidth below the preset frequency may be a bandwidth below the preset frequency and higher than or equal to the specific frequency.

In this case, based on the energy of the component below the preset frequency being greater than the energy of the component higher than or equal to the preset frequency, the electronic apparatus 100 may maintain the component higher than or equal to the preset frequency to obtain the fifth audio signal.

Meanwhile, based on the preset pattern being identified for each of the plurality of frames constituting the fourth audio signal, the electronic apparatus 100 may remove the component included in the bandwidth higher than or equal to the preset frequency to acquire the fifth audio signal.

Specifically, based on the value representing the similarity between the shape of the component included in the bandwidth below the preset frequency and the shape of the quadrant being greater than or equal to the preset value, the electronic apparatus 100 may remove the component included in the bandwidth higher than or equal to the preset frequency to acquire the fifth audio signal.

Alternatively, based on there being a component with a value of 0 in the component included in the bandwidth below the preset frequency, the electronic apparatus 100 may remove the component included in the bandwidth higher than or equal to the preset frequency to acquire the fifth audio signal.

In the above, various embodiments each have been described, but each embodiment is not necessarily implemented individually, and may be combined wholly or in part with at least one other embodiment and implemented together in one product.

Meanwhile, the term "unit" or "module" used in the disclosure may include units configured by hardware, software, or firmware, and may be used compatibly with terms, for example, logics, logic blocks, components, circuits, or the like. The "unit" or "module" may be an integrally configured component or a minimum unit performing one or more functions or a part thereof. For example, the module may be configured by an application-specific integrated circuit (ASIC).

Various embodiments of the present disclosure may be implemented by software including instructions stored in a machine-readable storage medium (for example, a computer-readable storage medium). A machine is a device capable of calling a stored instruction from a storage medium and operating according to the called instruction, and may include the electronic apparatus 100 of the disclosed embodiments. In a case where the instruction is executed by the processor, the processor may perform the function corresponding to the instruction directly or using other components under the control of the processor. The command may include codes created or executed by a compiler or an interpreter. The machine-readable storage medium may be provided in a form of a non-transitory storage medium. Here, the term "non-transitory" means that the storage medium is tangible without including a signal, and does not distinguish whether data are semi-permanently or temporarily stored in the storage medium.

According to one or more embodiments, the methods according to various embodiments disclosed in the document may be included in a computer program product and provided. The computer program product may be traded as a product between a seller and a purchaser. The computer program product may be distributed in a form of a storage medium (for example, a compact disc read only memory (CD-ROM)) that may be read by the machine or online through an application store (for example, PlayStore™). In case of the online distribution, at least a portion of the computer program product may be at least temporarily stored in a storage medium such as a memory of a server of a manufacturer, a server of an application store, or a relay server or be temporarily generated.

Each of the components (for example, modules or programs) according to the diverse embodiments may include a single entity or a plurality of entities, and some of the corresponding sub-components described above may be omitted or other sub-components may be further included in the diverse embodiments. Alternatively or additionally, some components (e.g., modules or programs) may be integrated into one entity and perform the same or similar functions performed by each corresponding component prior to integration. Operations performed by the modules, the programs, or the other components according to the diverse embodiments may be executed in a sequential manner, a parallel manner, an iterative manner, or a heuristic manner, at least some of the operations may be performed in a different order or be omitted, or other operations may be added.

While example embodiments have been illustrated and described above, it will be apparent to those skilled in the art that modifications and variations could be made without departing from the scope of the disclosure as defined by the appended claims.

What is claimed is:

1. A method of controlling an electronic apparatus, comprising:

acquiring a first audio signal comprising an audio signal corresponding to a first audio source and an audio signal corresponding to a second audio source;

acquiring a second audio signal by separating the audio signal corresponding to the first audio source from the first audio signal in a bandwidth below a preset frequency;

acquiring a third audio signal by separating an audio signal in a bandwidth higher than or equal to the preset frequency from the first audio signal;

acquiring a fourth audio signal by combining the second audio signal and the third audio signal;

for each of a plurality of frames constituting the fourth audio signal, comparing energy of a component below the preset frequency to energy of a component higher than or equal to the preset frequency, and based on the energy of the component below the preset frequency being less than the energy of the component higher than or equal to the preset frequency, acquiring a fifth audio signal by removing the component higher than or equal to the preset frequency from the fourth audio signal; and outputting the fifth audio signal.

2. The method as claimed in claim 1, wherein the acquiring the fifth audio signal comprises:

based on the energy of the component below the preset frequency being greater than or equal to the energy of the component higher than or equal to the preset frequency, acquiring the fifth audio signal by maintaining the component higher than or equal to the preset frequency.

3. The method as claimed in claim 1, wherein the acquiring the second audio signal comprises:

down sampling the first audio signal at a sampling rate corresponding to the preset frequency; and acquiring the second audio signal by separating the audio signal corresponding to the first audio source by inputting the down-sampled first audio signal to a neural network model.

4. The method as claimed in claim 1, wherein the acquiring the third audio signal comprises:

acquiring a feature in the bandwidth higher than or equal to the preset frequency in the first audio signal based on the second audio signal; and acquiring the third audio signal using the feature.

5. The method as claimed in claim 1, wherein the bandwidth below the preset frequency is below the preset frequency and higher than or equal to a specific frequency.

6. The method as claimed in claim 1, wherein the acquiring the fifth audio signal further comprises:

based on a preset pattern being identified for each of the plurality of frames constituting the fourth audio signal, acquiring the fifth audio signal by removing the component higher than or equal to the preset frequency.

7. The method as claimed in claim 6, wherein the acquiring of the fifth audio signal comprises:

based on a value representing a similarity between a shape of the component below the preset frequency and a shape of a quadrant being greater than or equal to a preset value, removing the component higher than or equal to the preset frequency to acquire the fifth audio signal.

8. The method as claimed in claim 6, wherein the acquiring the fifth audio signal comprises:

based on there being a component with a value of 0 among the component below the preset frequency, acquiring the fifth audio signal by removing the component higher than or equal to the preset frequency.

9. An electronic apparatus, comprising:

at least one memory storing instructions; and at least one processor operatively coupled to the at least one memory, the at least one processor being configured to execute the instructions to:

acquire a first audio signal comprising an audio signal corresponding to a first audio source and an audio signal corresponding to a second audio source;

acquire a second audio signal by separating the audio signal corresponding to the first audio source from the first audio signal in a bandwidth less than a preset frequency;

acquire a third audio signal by separating an audio signal in a bandwidth higher than or equal to the preset frequency from the first audio signal;

acquire a fourth audio signal by combining the second audio signal and the third audio signal;

for each of a plurality of frames constituting the fourth audio signal, compare energy of a component below the preset frequency to energy of a component higher than or equal to the preset frequency, and based on the energy of the component below the preset frequency being less than the energy of the component higher than or equal to the preset frequency, acquire a fifth audio signal by removing the component higher than or equal to the preset frequency from the fourth audio signal; and output the fifth audio signal.

10. The electronic apparatus as claimed in claim 9, wherein the at least one processor is further configured to execute the instructions to:

based on the energy of the component below the preset frequency being greater than or equal to the energy of the component higher than or equal to the preset frequency, acquire the fifth audio signal by maintaining the component higher than or equal to the preset frequency.

11. The electronic apparatus as claimed in claim 9, wherein the at least one processor is further configured to execute the instructions to:

down-sample the first audio signal at a sampling rate corresponding to the preset frequency; and acquire the second audio signal by separating the audio signal corresponding to the first audio source by inputting the down-sampled first audio signal to a neural network model.

12. The electronic apparatus as claimed in claim 9, wherein the at least one processor is further configured to execute the instructions to:

acquire a feature in the bandwidth higher than or equal to the preset frequency in the first audio signal based on the second audio signal; and acquire the third audio signal using the feature.

13. The electronic apparatus as claimed in claim 9, wherein the bandwidth below the preset frequency is below the preset frequency and higher than or equal to a specific frequency.

14. The electronic apparatus as claimed in claim 9, wherein the at least one processor is further configured to execute the instructions to:

based on a preset pattern being identified for each of the plurality of frames constituting the fourth audio signal, acquire the fifth audio signal by removing the component higher than or equal to the preset frequency.

15. The electronic apparatus as claimed in claim 14, wherein the at least one processor is further configured to execute the instructions to:

based on a value representing a similarity between a shape of the component below the preset frequency and a shape of a quadrant being greater than or equal to a preset value, acquire the fifth audio signal by removing the component higher than or equal to the preset frequency.

16. The electronic apparatus as claimed in claim 14, wherein the at least one processor is further configured to execute the instructions to:

based on there being a component with a value of 0 among the component below the preset frequency, acquiring the fifth audio signal by removing the component higher than or equal to the preset frequency.

17. A non-transitory computer readable medium storing instructions which are executable by at least one processor to perform a method for controlling an electronic apparatus, the method comprising:

acquiring a first audio signal comprising an audio signal corresponding to a first audio source and an audio signal corresponding to a second audio source;

acquiring a second audio signal by separating the audio signal corresponding to the first audio source from the first audio signal in a bandwidth below a preset frequency;

acquiring a third audio signal by separating an audio signal in a bandwidth higher than or equal to the preset frequency from the first audio signal;

acquiring a fourth audio signal by combining the second audio signal and the third audio signal;

for each of a plurality of frames constituting the fourth audio signal, comparing energy of a component below the preset frequency energy of a component higher than or equal to the preset frequency, and based on the energy of the component below the preset frequency being less than the energy of the component higher than or equal to the preset frequency, acquiring a fifth audio signal by removing the component higher than or equal to the preset frequency from the fourth audio signal; and outputting the fifth audio signal.

18. The non-transitory computer readable medium of claim 17, wherein the acquiring the fifth audio signal comprises:

based on the energy of the component below the preset frequency being greater than or equal to the energy of the component higher than or equal to the preset frequency, acquiring the fifth audio signal by maintaining the component higher than or equal to the preset frequency.

19. The non-transitory computer readable medium of claim 17, wherein the acquiring the second audio signal comprises:

down sampling the first audio signal at a sampling rate corresponding to the preset frequency; and acquiring the second audio signal by separating the audio signal corresponding to the first audio source by inputting the down-sampled first audio signal to a neural network model.

20. The non-transitory computer readable medium of claim 17, wherein the acquiring the third audio signal comprises:

acquiring a feature in the bandwidth higher than or equal to the preset frequency in the first audio signal based on the second audio signal; and acquiring the third audio signal using the feature.

* * * * *